(12) United States Patent
Wang et al.

(10) Patent No.: US 8,778,185 B2
(45) Date of Patent: Jul. 15, 2014

(54) METHODS OF CONDITIONING MIXED LIQUOR USING WATER SOLUBLE QUATERNARY AMMONIUM STARCHES

(75) Inventors: Sijing Wang, Shanghai (CN); Stephen R. Vasconcellos, Doylestown, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/935,175

(22) PCT Filed: Mar. 31, 2010

(86) PCT No.: PCT/CN2010/000410
§ 371 (c)(1),
(2), (4) Date: Sep. 28, 2010

(87) PCT Pub. No.: WO2011/120192
PCT Pub. Date: Oct. 6, 2011

(65) Prior Publication Data
US 2013/0037483 A1 Feb. 14, 2013

(51) Int. Cl.
*C02F 3/00* (2006.01)
(52) U.S. Cl.
USPC .......................................... 210/631; 210/767
(58) Field of Classification Search
USPC ................................. 210/631, 767
See application file for complete search history.

(56) References Cited

U.S. PATENT DOCUMENTS

| | | | |
|---|---|---|---|
| 3,606,731 A * | 9/1971 | Cole | 95/253 |
| 4,088,600 A | 5/1978 | Tutein et al. | |
| 5,248,449 A * | 9/1993 | Mitchell et al. | 516/150 |
| 6,723,245 B1 | 4/2004 | Collins et al. | |
| 6,872,312 B1 | 3/2005 | Shah et al. | |
| 6,926,832 B2 | 8/2005 | Collins et al. | |
| 7,378,023 B2 | 5/2008 | Yoon et al. | |
| 7,611,632 B1 | 11/2009 | Wang et al. | |
| 2004/0168980 A1* | 9/2004 | Musale et al. | 210/639 |
| 2006/0272198 A1 | 12/2006 | Yoon et al. | |
| 2008/0149561 A1* | 6/2008 | Chu et al. | 210/500.38 |
| 2009/0078640 A1* | 3/2009 | Chu et al. | 210/321.6 |
| 2010/0264079 A1* | 10/2010 | Begin et al. | 210/603 |

FOREIGN PATENT DOCUMENTS

| | | |
|---|---|---|
| CN | 1569698 A | 1/2005 |
| CN | 1990392 A | 7/2007 |
| WO | 2007006153 A1 | 7/2006 |
| WO | WO 2007006153 A1 | 1/2007 |

OTHER PUBLICATIONS

Material Safety Data Sheet—Klaraid PC2710, GE Water & Process Technologies, Jan. 12, 2007, 5 pages.
International Search Report and Written Opinion mailed Dec. 16, 2010 for PCT/CN2010/000410 filed Mar. 31, 2010.
International Preliminary Report on Patentability mailed Oct. 2, 2010 for PCT/CN2010/000410 filed Mar. 31, 2010.
State Intellectual Property Office, First Office Action issued Jun. 9, 2013 for CN 201080065968.2 filed Mar. 31, 2010.
European Search Report issued Aug. 23, 2013 for EP 10848654.9 filed Mar. 31, 2010.

* cited by examiner

*Primary Examiner* — Chester Barry
(74) *Attorney, Agent, or Firm* — Wegman, Hessler & Vanderburg

(57) ABSTRACT

Disclosed is a method of conditioning mixed liquor in membrane bioreactor (MBR) systems comprising adding an effective amount of a treatment composition comprising a water soluble cationic quaternary ammonium starch or a water soluble quaternary ammonium starch/gum blend to the mixed liquor. Also disclosed is a method of improving flux in an MBR system comprising adding the treatment composition to the mixed liquor of the MBR.

18 Claims, 1 Drawing Sheet

METHODS OF CONDITIONING MIXED LIQUOR USING WATER SOLUBLE QUATERNARY AMMONIUM STARCHES

FIELD OF INVENTION

The present invention pertains to methods for conditioning microbial mixed liquor and improving flux in membrane bioreactor (MBR) systems.

BACKGROUND

Biological treatment of wastewater for removal of dissolved organics is well known and is widely practiced in both municipal and industrial plants. This biological process is generally known as the "activated sludge" process in which micro-organisms consume organic compounds through their growth. The process necessarily includes sedimentation of the microorganisms or "biomass" to separate it from the water and complete the process of reducing Biological Oxygen Demand (BOD) and Total Suspension Solids (TSS) in the final effluent. The sedimentation step is typically done in a clarifier unit. Thus, the biological process is constrained by the need to produce biomass that has good settling properties. These conditions are especially difficult to maintain during intermittent periods of high organic loading and the appearance of contaminants that are toxic to the biomass.

Typically, an activated sludge treatment has a conversion ratio of organic materials to sludge of up to about 0.5 kg sludge/kg COD (chemical oxygen demand), thereby resulting in the generation of a considerable amount of excess sludge that must be disposed of The expense for the excess sludge treatment has been estimated at 40 to 60 percent of the total expense of a wastewater treatment plant. Moreover, a conventional disposal method of landfilling sludge may cause secondary pollution problems. Therefore, interest in methods to reduce the volume and mass of excess sludge has been growing rapidly.

Membranes coupled with biological reactors for the treatment of wastewater are well known but are not widely used. In these systems, ultrafiltration (UF), microfiltration (MF), or nanofiltration (NF) membranes replace sedimentation of biomass for solids-liquid separation. A membrane can be installed in a bioreactor tank or in an adjacent tank where mixed liquor, continuously pumped from the bioreactor tank and back, produces effluent with much lower total suspended solids (TSS), typically less than 5 mg /L, compared to 20 to 50 mg/L from a clarifier.

More importantly, membrane biological reactors (MBR) de-couple the biological process from the need to settle the biomass, since the membrane sieves the biomass from the water. This allows operation of the biological process at conditions that would not be desirable in a conventional system including: (1) high mixed liquor suspended solids (bacteria loading) of 10 to 30 g/L; (2) extended sludge retention time; and (3) short hydraulic retention time. In a conventional system, such conditions may lead to sludge bulking and poor settleability.

The benefits of an MBR operation include low sludge production, complete solids removal from the effluent, effluent disinfection, combined COD, solids and nutrient removal in a single unit, high loading rate capability, and minimal problems with sludge bulking Disadvantages include aeration limitations, membrane fouling, and membrane costs.

Membrane fouling can be attributed to surface deposition of suspended or dissolved substances. An MBR membrane interfaces with the biomass which contains aggregates of bacteria or "flocs", free bacteria, protozoan, and various dissolved microbial products (SMP). The term SMP has been adopted to define the organic compounds that are related into the bulk microbial mixed liquor from substrate metabolism (usually biomass growth) and biomass decay.

In operation, the colloidal solids and SMP have the potential of depositing on the surface of the membrane. Colloidal particles form layers on the surface of the membrane, called a "cake layer". MBR processes are designed to use rising coarse air bubbles to provide a turbulent cross flow velocity over the surface of the membrane. This process helps to maintain the flux through the membrane, by reducing the buildup of a cake layer at the membrane surface.

Compared to a conventional activated sludge process, floc (particle) size is reportedly much smaller in typical MBR units. Small particles can plug the membrane pores, a fouling condition that may not be reversible. Since MBR membrane pore size varies from about 0.04 to about 0.4 micrometers, particles smaller than this can cause pore plugging. Pore plugging increases membrane resistance and decreases membrane flux.

Efficient and stable operation of MBR systems largely depends on the conditions and qualities of the biological populations of the biomass in the MBR system. The characteristics of the mixed liquor, including viscosity, extracellular polymeric substances (EPS), floc size, and colloidal and soluble organic substances, affect membrane filterability. While traditional approaches mostly rely on optimization of hydrodynamics and air scouring to reduce membrane fouling in MBR systems, new efforts are more devoted to coagulate and flocculate the activated sludge by adding chemicals and thereby to bind colloids and other mixed liquor components in flocs. These filterability enhancement chemicals not only have a positive impact to decrease soluble foulants in the bulk phase, but also improve the hydraulic permeability of the cake formed on the surface of the membrane.

Recently, increasing efforts have been devoted to improving microbial mixed liquor filterability and enhance membrane flux in MBR systems. Options include use of inorganic coagulants such as ferric and aluminum salts and aluminum polymers, powdered activated carbon (PAC) and other types of inert particles (e.g., resins), and water soluble polymers. Use of inorganic coagulants will increase sludge generation and are only applicable to a narrow pH range. Addition of powdered activated carbon to MBR systems will not only increase sludge concentration, it may also cause irreversible permeability loss due to membrane pore plugging by PAC, and membrane wear due to the abrasiveness of the PAC. These problems will exaggerate, and additional fouling may develop when the added PAC concentration becomes higher (e.g., 600 mg/L or above).

Accordingly, there is a need for effective treatment for membrane flux enhancement, MBR efficiency improvement, and mixed liquor filterability enhancement.

BRIEF DESCRIPTION OF THE INVENTION

A method of treating mixed liquor in a membrane bioreactor (MBR) system is disclosed wherein an effective amount of the treatment composition is added to the mixed liquor. The treatment composition comprises a member selected from the group consisting of a 1) water soluble cationic quaternary ammonium starch and 2) water soluble quaternary ammonium starch/gum blend to the mixed liquor.

An effective amount of the treatment composition is added to the activated sludge for conditioning the activated sludge and for membrane flux enhancement in MBR systems.

The invention will be further described in conjunction with the appended drawing. The drawing is intended to show an exemplary embodiment of the invention and should not be construed as limiting all of the ways the invention can be utilized.

DETAILED DESCRIPTION

Figure 1:
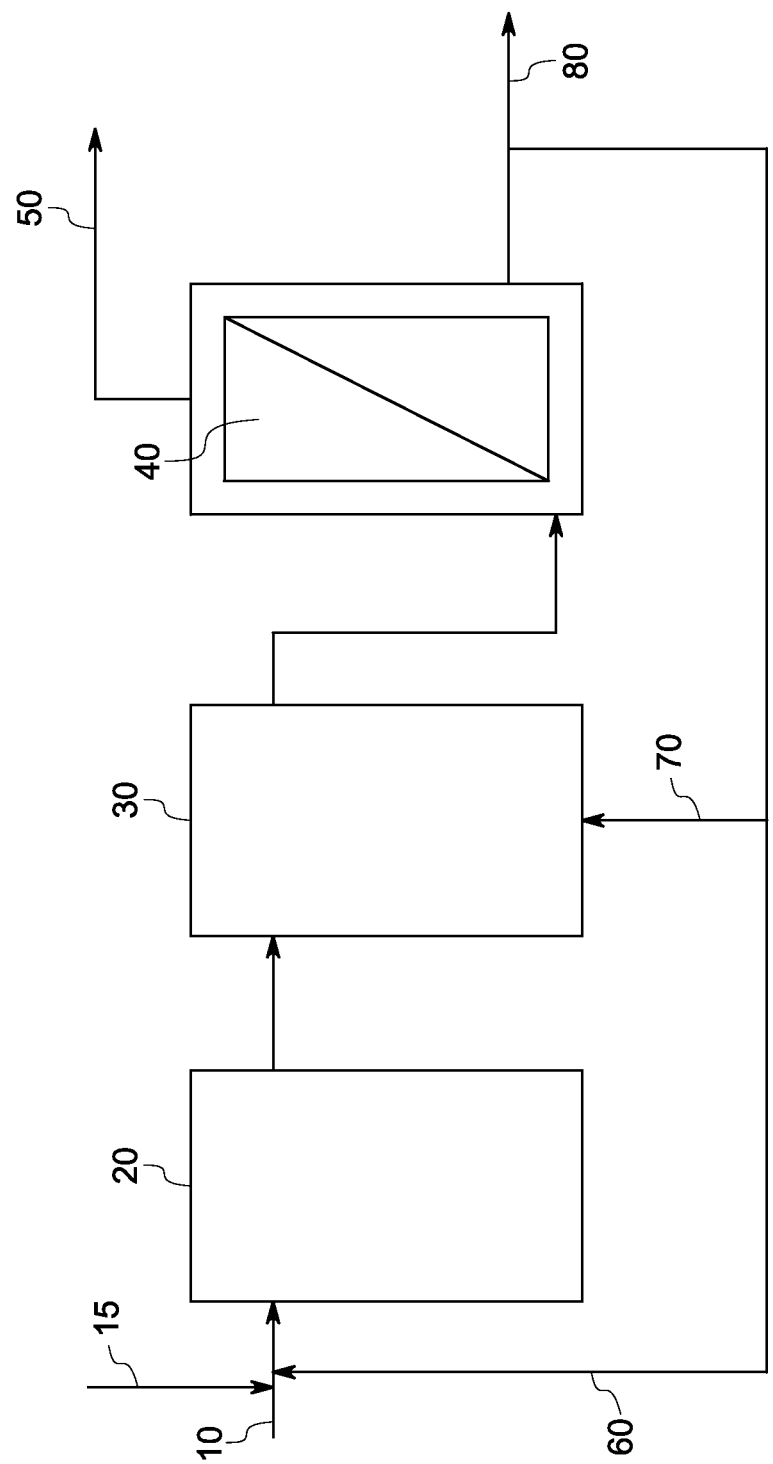
FIG. 1 is a schematic diagram of a typical example of an MBR in accordance with an embodiment of the invention.

As used here, MBR means membrane bioreactor or membrane biological reactor.

"Mixed liquor" or "activated sludge" means a mixture of wastewater, microorganisms used to degrade organic materials in the wastewater, organic containing material derived from cellular species, cellular byproducts and/or waste products, or cellular debris. Mixed liquor can also contain colloidal and particulate material (i.e., biomass/biosolids) and/or soluble molecules or biopolymers (i.e., polysaccharides, proteins, etc.).

"Mixed liquor suspended solids" ("MLSS") means the concentration of biomass which is treating organic material in the mixed liquor.

"Excess activated sludge" refers to the activated sludge that is continuously pumped from the bioreactor in order to maintain a constant sludge age in the bioreactor.

The present invention pertains to methods for treating mixed liquor to condition the mixed liquor and improve flux in membrane reactor systems (MBR) by adding to the mixed liquor a treatment composition comprising a water soluble cationic quaternary ammonium starch (I) or a cationic quaternary ammonium starch/gum blend (II) or a mixture of (I) and (II).

As to the cationic quaternary starches (CQS) (I) that may be employed, these are described in U.S. Pat. NO. 4,088,600. Basically, as is set forth in the U.S. Pat. No. 4,088,600, the CQS consists mainly of two moieties, namely a starch group and a quaternary ammonium salt group. The starch group may be prepared from a host of starches and starch fractions including acid or enzyme modified corn or waxy starches. Exemplary starches include those prepared from corn, potato, tapioca, sago, rice, wheat, waxy maize, grain sorghum, grain starches in raw or modified forms such as those modified with acids, oxidizing agents and the like; to amylose and amylpectin and to the linear and branched components respectively, of cornstarch and also to dextrins.

The quaternary ammonium compound used to form the CQS is generally of the formula:

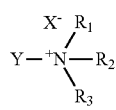

(Formula I)

in which $X^-$ is any monovalent anion, e.g., chloride, bromide, iodide, or methyl sulfate; Y is from the group consisting of 2,3-epoxy propyl, 3-halo-2-hydroxy propyl, 2 haloethyl, o, p, or m ($\alpha$ hydroxy-$\beta$halo ethyl) benzyl; $R_1$, $R_2$, and $R_3$ are from the group consisting of hydrogen, hydroxyl, alkyl, substituted alkyl, aryl and arallkyl; in which two of the R's may be joined to form a hetercylic or homocyclic ring compound; in which the total number of carbons in all three of $R_1$, $R_2$, and $R_3$ should not exceed about 14 carbons. If all three of $R_1$, $R_2$ and $R_3$ are different, and $R_3$ contains more than 3 carbon atoms but not more than 12, then $R_1$ and $R_2$ should preferably be from the group consisting of methyl and ethyl; and if $R_1$ and $R_2$ are joined to form a ring compound, $R_3$ should preferably not be greater than ethyl.

The reaction to make the cationic starch involves the hydroxyl groups on the starch molecule and the reactive Y group of the quaternary ammonium reactant, so that the resulting cationic starch product has the formula

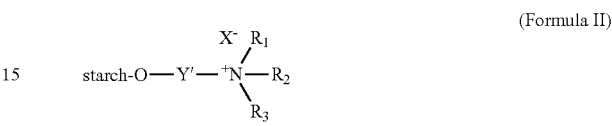

(Formula II)

in which Y' is the reaction residue of Y and X and the R→s are unaltered. Y' would thus be (typically) 2 hydroxyl propyl, ethyl, or o, p or m ($\alpha$ hydroxy-$\beta$halo ethyl) benzyl.

In a typical case using N-(3-chloro-2-hydroxypropyl)trimethylammonium chloride, the reaction may proceed simplistically as Starch-OH+Cl $CH_2$—CH(OH)—$CH_2$ $N^+(CH_3)_3Cl^-$+NaOH→

Starch-O—$CH_2$—CH(OH)—

$CH_2N^-(CH_3)_3Cl^-$+NaCl+$H_2O$.

In one exemplary embodiment, a number of quaternary ammonium cationic starches may be prepared by reacting modified cornstarch with varying amounts of N-(3-chloro-2-hydroxy propyl)trimethyl ammonium chloride, with sodium hydroxide as catalyst. The degree of substitution (D.S.) of these products is calculated theoretically and is found to be in the range of 0.1 to 0.45. The degree of substitution is defined as a number of moles of quaternary ammonium substituent, in this case

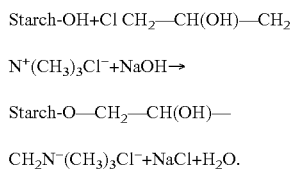

per anhydroglucose unit.

Exemplary quaternary ammonium cationic starches include those wherein the degree of substitution can be within the range of about 0.01 to 0.75 quaternary units conforming to Formula II given above, per anhydroglucose unit in the starch group. Preferably, it is about 0.1-0.45. One preferred CQS is commercially available and sold by GE under the Klaraid PC2710 designation. It is prepared via reaction of 3-chloro-2-hydroxpropyltrimethylammoniumchloride and "Melogel" corn starch. The corn starch is present in an amount of about 13.9% (by weight), and the polymer product contains about 31% actives (by weight). The quat component is present in an amount of about 18.2 wt %. Another exemplary CQS is commercially available and sold by GE under the Klaraid 2712 designation. It is prepared via reaction of 3-chloro-2-hydroxypropyltrimethyl ammonium chloride and a hydrolyzed starch. The acid hydrolyzed starch is present in an amount of about 16.6 wt %, and the product contains about 27% actives by weight. The "quat" is present in an amount of about 5.4 wt %.

In another aspect of the invention, the treatment composition is quaternary ammonium starch/gum mixture or blend (CQS & G), and this treatment is added to the mixed liquor. The CQS & G mixtures are described in U.S. Pat. No. 5,248,449. These consist mainly of three components, namely: 1) a quaternary ammonium salt as described above; 2) a starch group as described above; and 3) a gum component. Generally, the CQS & G blends are prepared by reacting a mixture of starch and natural gum with the quaternary ammonium compound in the presence of an alkali catalyst at a pH in the range of about 12-13. One such exemplary CQS & G blend is commercially available from GE and is sold under the designation Klaraid PC 2716. It is a condensation product of 11.2% mixture of acid hydrolyzed starch/gum and 13.9 wt % 3-chloro-2-hydroxypropyl-trimethylammonium chloride. The starch:guar gum ratio is about 6.6:1 by weight.

In one exemplary embodiment, the cationic quaternary ammonium starch and gum combinations contain between 0.7-3% preferably 1.0-2.1% by weight gum, 7-30% preferably, 12-16% by weight starch and a sufficient amount of the quaternary compound to assure a cationic charge in the range of about 0.2-2.0 meq/g, which amount is typically achieved with a weight percent of 2-50%, preferably 7-33%.

Suitable natural gums for use in this invention include, but are not limited to, carboxymethyl cellulose, guar, locust bean, karaya, alginate including propylene glycol algienate and sodium alginate and xanthum gum and is preferably guar, carboxymethyl cellulose, or alginate gum.

The synthesis reactions to produce the cationic quaternary ammonium modified starch-gum compositions of the instant invention generally involve reacting the hydroxyl groups on the starch and gum molecules with the reactive Y group of the quaternary ammonium reactant. Thus, for example, in a typical case where the gum is guar gum, the quaternary ammonium compound is N-(3-chloro-2-hydroxypropyl)trimethylammonium chloride, and the alkali is sodium hydroxide; the simplified reaction may be expressed as:

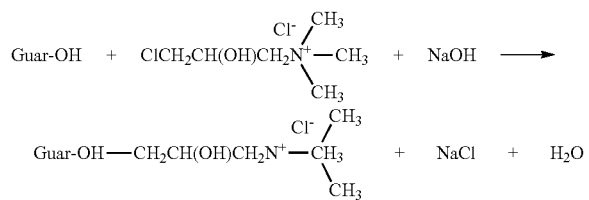

Similarly, the simplified reaction for the cationic starch may be expressed as follows:

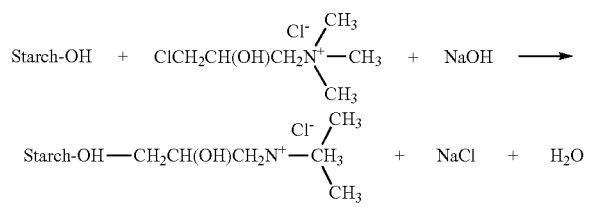

In order to form the water soluble quaternary ammonium starch/gum blends, the quaternary ammonium compound reactant is the same as set forth above. The starch and gum molecules are modified via the reaction so that the reactant bonds with the hydrogen atom available from the hydroxyl moiety on the gum or starch molecule. The ammonium modified starch therefore has the structure:

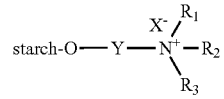

and the cationic quaternary ammonium modified gum has the formula:

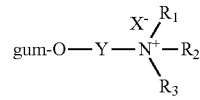

wherein Y, $X^-$, $R_1$, $R_2$, and $R_3$ are all as previously defined. (See Formula I).

Exemplary CQS & G blends have a degree of substitution in the range of 0.1-1.8, preferably 0.2 to 1.2 wherein the degree of substitution (D.O.S.) is defined as the number of moles of quaternary ammonium substituent per anhydroglucose unit contributed by the starch and gums.

Exemplary combinations of the guar gum and starch components of the CQS & G treatment composition include weight ratios of cornstarch:gum (guar gum) of between about 5-15 starch:1 gum. Exemplary ranges by weight of gum and starch are as follows: 0.7-3% gum and 7 to about 30 wt % starch. The viscosity of the blend should preferably not exceed about 10,000 cps. As to the dosages that may be employed, the CQS and CQS & G blends may each be added in an amount of about 5 to about 1,000 ppm of the treatment composition in the mixed liquor.

In one embodiment, a method of conditioning mixed liquor in a membrane bioreactor (MBR) system comprises adding a treatment composition comprising an effective amount of either the CQS or CQS & G blend to the mixed liquor. In another embodiment, a method of improving flux in an MBR system comprises adding an effective amount of the CQS or CQS & G blend to mixed liquor of the MBR.

The treatment composition of the invention, i.e., CQS or CQS & G, may be used to condition the biomass or activated sludge of MBR systems and adding an effective amount of the treatment composition can substantially improve filtering characteristics of sludge. In one embodiment, adding an effective amount of the treatment to the mixed liquor or activated sludge of an MBR can greatly improve sludge filterability, thereby reducing the risk to the MBR associated with handling peak flows, reducing membrane cleaning requirements, and the MBR systems can be designed at higher flux rate. In another embodiment, adding an effective amount of the treatment allows for mixed liquor filterability enhancement in MBR systems. In an alternate embodiment, adding an effective amount of the treatment improves filtering characteristics of sludge.

The treatment composition of the invention may be added to the system neat or in solution, either continuously or intermittently. The treatment composition should not be added directly in contact with the activated sludge at the membrane surface, but rather it should be added upstream of the membrane surface to ensure complete mixing with the activated sludge. An effective amount of the treatment composition is added to activated sludge of an MBR system. In one embodiment, the treatment is thoroughly mixed with the mixed liquor prior to being in direct contact with the membrane surface. In another embodiment, the mixing is accomplished by feeding the treatment composition into an area of the MBR where sufficient mixing time occurs, in proximity to a pump station, an aeration nozzle, or a sludge or mixed liquor recycling pipe.

The effective amount of the treatment depends on the filterability of the mixed liquor in the MBR system. The characteristics of the mixed liquor, including mixed liquor suspended solids (MLSS) concentration, viscosity, extracellular polymeric substance (EPS), floc size, and colloidal and soluble organic substances all may affect membrane filterability. In one embodiment, the effective amount of the treatment is from about 5 to about 1000 ppm active treatment in the MBR.

In a typical MBR unit, influent wastewater is pumped or allowed to flow via gravity into a bioreactor tank where it is brought into contact with the microorganisms which biodegrade organic material in the wastewater. Aeration means such as blowers provide oxygen to the biomass. The resulting mixed liquor contained in the bioreactor is filtered through membranes under pressure or is drawn through the membrane under vacuum. The membrane may be immersed in the bioreactor tank or contained in a separate membrane tank to which wastewater is continuously pumped from the bioreactor tank. Clarified water is discharged from the system and excess activated sludge is pumped out of the bioreactor tank into a sludge holding tank in order to maintain a constant sludge age (SRT). The filtration membrane is regularly cleaned by backwashing, chemical washing, or both.

An MBR can be configured in various ways. Turning now to FIG. 1, wastewater 10 is often pretreated to remove coarse solids, suspended solids, and various fiber materials before entering an MBR system. An MBR system may consist of an anoxic tank 20, an aerobic tank 30, and a membrane tank 40. Membrane filtrate 50 is separated from the activated sludge and exits the membrane. The activated sludge from membrane tank 40 is recycled to either an anoxic tank 60 or an aerobic tank 70. A portion of activated sludge 80 from the membrane tank 40 is drawn out for disposal in order to maintain an appropriate sludge retention time (SRT) in the MBR. The treatment composition of the invention may be added to the influent wastewater 10, as shown at 15, the anoxic tank 20, the aerobic tank 30, or the membrane tank 40.

A MBR system may be comprised of a combination of at least two of the following types of reactors: anaerobic reactors, anoxic reactors, and aerobic reactors. A simplified MBR system may be comprised of just one aerobic tank, and the membrane module is submersed in the aerobic tank. Alternatively, the membrane bioreactor may comprise one or more aerobic reactors, one or more anaerobic digesters, or a combination of one or more anaerobic digesters and one or more aerobic reactors. An MBR system couples biological wastewater treatment and membrane filtration. The present invention applies to all MBR systems, whenever a membrane flux enhancement occurs.

Membranes used in the MBR unit include, but are not limited to, ultra-, micro-, and nanofiltration, inner and outer skin, hollow fibers, tubular, and flat, organic, metallic, ceramic, and the like. Membranes for commercial application include, but are not limited to, hollow fibers with an outer skin ultrafilters, flat sheet (in stacks) microfilter and hollow fiber with an outer skin microfilter.

Membrane materials may include, but are not limited to, chlorinated polyethylene (PVC), polyvinylidene fluoride (PVDF), polyacrylonitrile (PAN), polysulfone (PSF), polyethersulfone (PES), polyvinylalcohol (PVA), cellulose acetate (CA), regenerated cellulose (RC) as well as inorganics.

Adding an effective amount of the treatment composition allows for mixed liquor filterability enhancement in MBR systems. In addition, adding an effective amount of the treatment composition improves filtering characteristics of sludge. Adding an effective amount of the treatment greatly improves sludge filterability, reduces the risk to the MBR associated with handling peak flows, reduces membrane cleaning requirements, and provides for an MBR system that can be designed at a higher flux rate.

EXAMPLES

The invention will now be further described with reference to the following examples which are to be regarded solely as illustrative and not as restricting the scope of the invention.

Example 1

Mixed liquor samples for testing in Examples 1-2 were taken from a municipal Wastewater Treatment Plant. The samples were taken from the activated sludge recycling line where the MLSS concentration was above 10 g/L.

A standard jar test with a Jar Tester (Phipps & Bird™) on each testing sample and control sample was conducted to ensure proper mixing. Four 500 ml aliquots of the mixed liquor were added to four jars. A treatment additive, in accordance with the invention, Polymer A, was quickly added to each sample, in the amounts shown in Table 1. A control sample was also prepared by adding 500 ml of the mixed liquor to a control jar without the addition of a treatment additive. All the samples were rapidly agitated at 200 rpm for 30 seconds and then at a slow agitation speed of 50 rpm for 15 minutes to thoroughly mix the samples.

The filterability of the mixed liquor for each sample including the Control Jar was evaluated by the Time-to-Filter (TTF) test method. The TTF test method was adapted from Standard Methods (APHA, 1992), Method #2710H. A 9 cm filter paper (Whatman GF/C, Catalog No. 1822 090) was placed in a Buchner funnel and was wet to form a good seal. A 200 ml sample from each of the treated mixed liquor samples and the Control Jar was added to a separate Buchner funnel (as prepared above). A vacuum pressure of 51 kPa (15 inch Hg) was applied using a vacuum pump with a pressure regulator. The time required to filter 50 ml (or 25% of the initial sample volume (25%-TTF)) and 100 ml (or 50% of the initial sample volume (50%-TTF)) of each mixed liquor sample was measured, respectively, and is shown in Table 1.

TABLE 1

| | Polymer A | | | | |
| --- | --- | --- | --- | --- | --- |
| Sample | Dosage (ppm) | 25%-TTF (s) | 50%-TTF (s) | 25%-TTF reduction compared to the Control | 50%-TTF reduction compared to the Control |
| Control | 0 | 319 | 1741 | 0.0% | 0.0% |
| 1 | 100 | 197 | 1034 | 38.2% | 40.6% |
| 2 | 250 | 90 | 477 | 71.8% | 72.6% |
| 3 | 500 | 22 | 109 | 93.1% | 93.7% |

The data show a very significant improvement in the filterability of the mixed liquor by adding the treatment additive of Polymer A. The experiments showed that up to more than a 90% reduction in TTF can be achieved by dosing an effective amount of the polymer for conditioning of the mixed liquor samples.

Example 2

A standard jar test with a Jar Tester (Phipps & Bird™) on each following testing sample and control sample was conducted to ensure proper mixing. Four 500 ml aliquots of the mixed liquor were added to four jars. A treatment additive, in accordance with the invention, Polymer B, as shown in Table 2 was added to each sample. A control sample was also prepared by adding 500 ml of the mixed liquor to a control jar without the addition of a treatment additive. All the samples were rapidly agitated at 200 rpm for 30 seconds and then at a slow agitation speed of 50 rpm for 15 minutes to thoroughly mix the samples.

The filterability of the mixed liquor for each sample including the Control Jar was evaluated by the TTF test method as described in Example 1. A 200 ml sample from each of the treated mixed liquor samples and the Control Jar was added to a separate Buchner funnel. A vacuum pressure of 51 kPa (15 inch Hg) was applied using a vacuum pump with a pressure regulator. The time required to filter 50 ml (or 25% of the initial sample volume (25%-TTF)) of each mixed liquor sample was measured and is shown in Table 2.

TABLE 2

| | Polymer B | | |
|---|---|---|---|
| Sample | Dosage (ppm) | 25%-TTF (s) | 25%-TTF reduction compared to the Control |
| Control | 0 | 523 | 0.0% |
| 1 | 100 | 394 | 24.7% |
| 2 | 250 | 212 | 59.5% |
| 3 | 500 | 73 | 86.0% |

The data show that the treatment Polymer B also can enhance the filterability of the mixed liquor samples.

Polymer A=Cationic quaternary ammonium modified starch polymer—prepared via reaction of 3-chloro-2-hydroxypropyltrimethylammoniumchloride and "Melogel" corn starch. The corn starch is present in an amount of about 13.9% by weight, and the product contains about 31% actives by weight—available GE Klaraid PC 2710. The "quat" is present in an amount of about 18.2 wt %.

Polymer B=Cationic quaternary ammonium polymer modified with an acid-hydrolyzed starch—prepared via reaction of 3-chloro-2-hydroxypropyl-trimethylammonium chloride and a hydrolyzed starch. The acid-hydrolyzed starch is present in an amount of about 16.6% and the product contains about 27% actives by weight—available GE Klaraid PC2712. The "quat" is present in an amount of about 5.4 wt %.

While the present invention has been described with references to preferred embodiments, various changes or substitutions may be made to these embodiments by those ordinarily skilled in the art pertinent to the present invention without departing from the technical scope of the present invention. Therefore, the scope of the present invention encompasses not only those embodiments described above, but also all that fall within the scope of the appended claims.

What is claimed is:

1. A method of treating mixed liquor in a membrane bioreactor (MBR) system comprising adding an effective amount of a treatment composition to the mixed liquor, said treatment composition comprising a member selected from the group consisting of a 1) water soluble cationic quaternary ammonium starch and a 2) water soluble quaternary ammonium starch/gum blend, then passing said mixed liquor with said treatment composition therein through a separatory membrane chosen from the group consisting of ultrafiltration, microfiltration, and nanofiltration membranes to increase flux rate of said mixed liquor through said separating membrane.

2. The method of claim 1 wherein said water soluble cationic starch is present and has the formula:

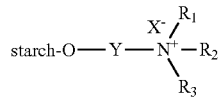

wherein X is any monovalent anion including, chloride, bromide, iodide, methyl sulfate; Y is selected from the group consisting of 2, 3 epoxy propyl, 3-halo-2-hydroxy propyl, 2 haloethyl, o, p or m (αhydroxy-β halo ethyl) benzyl; $R_1$, $R_2$, and $R_3$ are independently selected from the group consisting of hydrogen, hydroxyl, alkyl, substituted alkyl, aryl and alkaryl, and in which two of the Rs may be joined to form a heterocyclic ring compound or a homocyclic ring compound, further in which the total number of carbons in all three of $R_1$, $R_2$, and $R_3$ should not exceed about 14 carbons, with the proviso that if all three of $R_1$, $R_2$, and $R_3$ are different and $R_3$ contains more than 3 carbon atoms but not more than 12, then $R_1$ and $R_2$ are from the group consisting of methyl and ethyl; and if $R_1$ and $R_2$ are joined to form a ring compound, $R_3$ is an alkyl group not greater than ethyl wherein the concentration of starch in the composition is in the range of 7 to 30 percent by weight.

3. A method according to claim 2 wherein the starch is selected from the group consisting of corn, potato, tapioca, sago, wheat, waxy maize, grain sorghum, grain starches, and dextrin.

4. A method according to claim 2 wherein the degree of substitution of the composition is in the range of 0.2 to 1.2.

5. A method according to claim 2 wherein the degree of substitution of the composition is in the range of 0.1 to 1.8.

6. A method according to claim 2 wherein the water soluble quaternary ammonium starch is mixed with the mixed liquor prior to being brought into direct contact with the membrane surface.

7. The method of claim 6 wherein the mixing is accomplished by feeding the water soluble cationic quaternary ammonium starch into an area of the MBR where an intensive mixing occurs.

8. The method of claim 6 wherein the mixing is accomplished by feeding the water soluble cationic quaternary ammonium starch into an area of the MBR where sufficient mixing time occurs.

9. The method of claim 1 wherein said treatment composition is fed to said mixed liquor in an amount of about 5 ppm to about 1,000 ppm.

10. A method according to claim 1 wherein said water soluble quaternary ammonium starch/gum blend is present, said cationic ammonium modified starch having the formula:

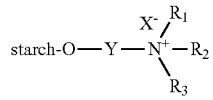

and said cationic quaternary ammonium modified gum has the formula:

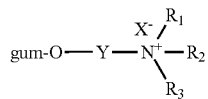

wherein X is any monovalent anion including chloride, bromide, iodide, methyl sulfate; Y is selected from the group consisting of 2, 3 epoxy propyl, 3-halo-2-hydroxy propyl, 2 haloethyl, o, p or m (αhydroxy-β halo ethyl) benzyl; $R_1$, $R_2$, and $R_3$ are independently selected from the group consisting of hydrogen, hydroxyl, alkyl, substituted alkyl, aryl, and alkaryl, and in which two of the Rs may be joined to form a heterocyclic ring compound or a homocyclic ring compound further in which the total number of carbons in all three of $R_1$, $R_2$, and $R_3$ should not exceed about 14.

11. A method according to claim 10 wherein the gum is selected from the group consisting of guar, carboxylmethyl cellulose, propylene glycol alginate, locust bean karaya, sodium alginate and xanthum.

12. A method according to claim 10 wherein the starch is selected from the group consisting of corn, potato, tapioca, sago, rice wheat, waxy maize, grain sorghum, grain starches, and dextrin.

13. A method according to claim 10 wherein the degree of substitution of the composition is in the range of 0.2 to 1.2.

14. A method according to claim 10 wherein the degree of substitution of the composition is in the range of 0.1 to 1.8.

15. A method according to claim 10 wherein the concentration of gum in the composition is in the range of 1.0 to 2.1% by weight, and the concentration of starch is in the range 12 to 16% by weight.

16. The method of claim 10 wherein the water soluble quaternary ammonium starch/gum blend is mixed with the mixed liquor prior to being in direct contact with the membrane surface.

17. The method of claim 16 wherein the mixing is accomplished by feeding the water soluble quaternary ammonium starch/gum blend into an area of the MBR where an intensive mixing occurs.

18. The method of claim 16 wherein the mixing is accomplished by feeding the water soluble quaternary ammonium starch/gum blend into an area of the MBR where sufficient mixing time occurs.

* * * * *